United States Patent Office 3,505,293
Patented Apr. 7, 1970

3,505,293
POLYESTER ADHESIVE
George Everett Bond, Jr., Charles J. Kibler, and Gerald R. Lappin, Kingsport, Tenn., assignors to Eastman Kodak Company, Rochester, N.Y., a corporation of New Jersey
No Drawing. Filed Apr. 4, 1966, Ser. No. 539,636
Int. Cl. B32b 9/04; C08g 17/04
U.S. Cl. 260—75
5 Claims

ABSTRACT OF THE DISCLOSURE

Polyesters useful as adhesives are prepared from (A) 1,4-butanediol and (B) a mixture of terephthalic acid, isophthalic acid, and hexahydroisophthalic acid, or derivatives of such acids.

---

This invention relates to an improved hot-melt polyester adhesive and, more particularly, it relates to such an adhesive which is advantageously employed in the preparation of shoes.

In U.S. Patent 3,168,754 there is disclosed a method for attaching a shoe sole to a shoe upper by means of a special polyester adhesive. The patented adhesive is applied to the individual components of the shoe and the adhesive-treated components are then capable of being immediately stacked and stored for later use without fear of premature bonding. At a subsequent time, the stored shoe components with their adhesive coatings are heated, e.g. by radiant heating, and joined under pressure for a few seconds, causing the two components of the shoe to be tightly bonded together. One of the advantages of this adhesive is that when it is originally applied as a hot melt to the cool shoe components, it does not penetrate into the leather and can be manually stripped therefrom, thus permitting easy removal of imperfectly applied coatings. Furthermore, so long as it is kept at normal storage temperatures, the adhesive does not bond to itself or to other materials, thus permitting stacking and storage of the coated components. When it is desired to activate the adhesive to cause it to form a tight bond with the shoe leather or with itself, the adhesive need only be heated to an activation temperature and assembled under pressure for a very few seconds. Enough bonding strength is developed in that short time to permit release of the assembling pressure; the full bond strength being developed as the adhesive and the assembly continue to cool and to age.

While polyester adhesives are remarkably well suited for use in shoe assemblies, as compared to previously used adhesive compositions, improvements in certain of the properties of the polyester adhesives has been needed to meet the demands of shoe manufacturers. The most desirable combination of properties which should be exhibited by an adhesive for the bonding of shoe soles to shoe uppers is as follows:

(1) An activation temperature below 160° C.;
(2) The achievement of high bonding strengths without the necessity of employing a primer when joining any of a variety of materials such as natural leather, synthetic leather, canvas, rubber, and synthetic shoe sole compositions;
(3) Rapid attainment of bond strength after the adhesively coated surfaces have been pressed together;
(4) A peel strength of at least 25 lb. per inch;
(5) Flexibility without embrittlement or loss of adhesion after aging; and
(6) Retention of bond strength and flexibility over a wide range of temperature, e.g. about —20° C. to about 60° C.

Prior to this invention, no known polyester adhesive was available which would provide all of the above properties.

It is an object of this invention to provide a novel, useful polyester.

It is an object of this invention to provide a hot-melt polyester adhesive which is particularly well-adapted for use in joining a shoe sole with a shoe upper.

It is an object of this invention to provide a hot-melt polyester adhesive having all of the above properties.

It is another object of this invention to provide a polyester composition which is useful as a modifier for cellulose acetate butyrate compositions.

It is still another object of this invention to provide a novel polyester composition having utility as a binder for high dielectric molding compositions.

It is still another object of this invention to provide a polyester composition having general utility as a high strength adhesive.

Still other objects will appear from the more detailed description of this invention which follows.

The foregoing objects are accomplished in accordance with this invention by providing a polyester consisting essentially of (A) 1,4-butanediol and (B) a mixture of the following dicarboxylic acids or their dicarboxylic acid-functioning derivatives: 20–65 mole percent terephthalic acid, 30–60 mole percent isophthalic acid, and 5–20 mole percent hexahydroisophthalic acid. In a preferred embodiment of this invention, the foregoing objects are accomplished by providing a polyester as described above, but wherein the proportions of mixture (B) are: 40 mole percent terephthalic acid or its derivative, 40–55 mole percent isophthalic acid or its derivative, and 5–20 mole percent hexahydroisophthalic acid or its derivative.

In one particular embodiment of this invention, the foregoing objects are accomplished by providing a laminate comprising two layers which are bonded to each other by a central layer of the above-described polyester adhesive, the two layers being selected from the group consisting of leather, cloth, rubber, paper, and synthetic resinous materials. Preferably, this embodiment of the invention incorporates leather as at least one of the two layers of the laminate.

The hot-melt adhesive of this invention is a polyester derived from the reaction of a diol and a dibasic acid material. In this invention, the diol is 1,4-butanediol and the dibasic acid is a mixture of three materials in specific proportions. These materials may be the dicarboxylic acids themselves or the derivatives of such acids which function as dicarboxylic acids. These acid-functioning derivatives include the dialkyl esters of such acids, the diacid chlorides of such acids, and the corresponding anhydrides of such acids. The three dicarboxylic acids which are employed in this invention are terephthalic acid, isophthalic acid, and hexahydroisophthalic acid. The acid-functioning derivatives of these acids, therefore, include the esters such as terephthalates, isophthalates, and hexahydroisophthalates; the acid halides such as terephthaloyl chloride, isophthaloyl chloride, and hexahydroisophthaloyl chloride, and the corresponding bromides, iodides, and fluorides; and the anhydrides such as terephthalic anhydride, isophthalic anhydride, and hexahydroisophthalic anhydride. The esters are the preferred acid-functioning derivatives because they provide a measure of control over the condensation reaction and a certain amount of convenience and safety in handling. The preferred esters are the dialkyl esters, in which the alkyl groups have 1 to 6 carbon atoms. Among the preferred esters, therefore, are dimethyl terephthalate, diethyl terephthalate, dipropyl terephthalate, dibutyl terephthalate, dipentyl terephthalate, and dihexyl terephthalate, and the corresponding isophthalates and hexahydroisophthalates.

The proportions of the dicarboxylic acids or their dicarboxylic acid-functioning derivatives are critical. In the broadest scope of this invention, the molar proportions of the three acid components are as follows:

| | Percent |
|---|---|
| Terephthalic acid | 20-65 |
| Isophthalic acid | 30-60 |
| Hexahydroisophthalic acid | 5-20 |

Within the ranges given above, the proportions of the various acids may be varied to obtain the most desirable adhesive for a given application. In general, it may be said that by increasing the relative amount of terephthalic acid, the resulting polyester has better high temperature properties. Similarly, if the proportion of hexahydroisophthalic acid is increased, the resulting polyester has better adhesiveness with respect to certain substrates, and exhibits greater flexibility at low temperatures. A particularly desirable polyester for many applications, and one which appears to provide an optimum in the various properties, is one having the following proportions of the acid components:

| | Percent |
|---|---|
| Terephthalic acid | 40 |
| Isophthalic acid | 40-55 |
| Hexahydroisophthalic acid | 5-20 |

It is important that the polyester of this invention have a sufficiently high degree of polymerization to have the necessary strength properties and flow properties for use as an adhesive. A convenient means of measuring this characteristic of the polyester is in terms of its inherent viscosity. The polyesters of this invention should have an inherent viscosity of about 0.60 to about 1.10 and, preferably, from about 0.65 to about 0.85.

The polyesters of this composition are prepared by known techniques of condensing the diol component with the dicarboxylic acid component in the presence of, or in the absence of, a catalyst. Normally, the diol component is present in a small excess, and this excess is removed as soon as the condensation reaction has gone to completion. The catalysts which are employed are normally the salts or oxides of metals such as tin, antimony, titanium, zinc, calcium, and the like.

The polyesters of this invention may be employed as adhesives in two general methods of application. In one means, the two substrates which are to be laminated are warmed to a temperature of about 40° C.-65° C., or higher if the material will withstand the higher temperature, and the polyester adhesive, in a molten state at a temperature of about 220° C.-260° C., is applied to the surface of one or both of the substrates. The adhesive may be applied by spreading, coating, spraying, or any other convenient means of applying the adhesive. The two substrates may then be assembled in the proper relationship and pressed against each other for a period of 10-20 seconds until the adhesive has cooled sufficiently to develop the initial strength required to hold the substrates together while further strength development continues.

In an alternate procedure, the adhesive is applied to the substrates as described above (although the temperature of the substrate may be as low as room temperature), but the two substrates are not immediately assembled and pressed together for lamination. Instead, the substrates are cooled and set aside for future use. When it is desired to assemble the substrates, they are heated to a temperature of about 150° C.-160° C., assembled, and pressed together for about 10-20 seconds, as described above. In the latter method, the adhesive-coated substrates may be stacked on one another, stored, or the like, without bonding so long as the temperature is maintained below that which causes the adhesive to become activated. This method is particularly advantageous in the assembly of shoe parts such as the attachment of shoe soles to shoe uppers, since the shoe parts can be separately prepared and coated with an adhesive and stored until it is time to assemble the various parts into a shoe, at which time the adhesive can be activated and the shoe parts assembled.

This invention can be better understood by reference to the following illustrative examples which are intended to show various embodiments of this invention without restricting it to such embodiments.

EXAMPLES 1-17

The polyesters employed in these examples were prepared by the general process of mixing 1,4-butanediol with a specific combination of dimethyl terephthalate, dimethyl isophthalate, and dimethyl hexahydroisophthalate. The amount of diol was 20-50% molar excess over that required by stoichiometry to combine with the acid-functioning components. A catalytic amount of a metallic catalyst, e.g. titanium isopropoxide, was added and the entire mixture stirred and heated to a temperature of about 200° C.-220° C. for four hours. Methanol was removed from the mixture by distillation. The pressure in the reaction vessel was lowered to about 0.1 mm. Hg, and the temperature raised to about 265° C. The product was stirred at this temperature and at this reduced pressure for about 20 minutes and then cooled. The proportions of acid components of the polyester in the final product are shown in the table below.

Each of the polyester adhesives, prepared as described above, was employed to laminate the indicated materials in the form of sample strips 1" x 6" in size. The lamination was prepared at one end of the strips, covering an area of only 1" square of the substrates. In order to provide a maximum bonding surface before application of the adhesive, the substrates were roughened and scored in the proposed area of lamination. The adhesive was applied at the temperature indicated and the two laminates were then pressed together under a pressure of about 80 p.s.i. for 10 seconds. The bonding was tested by determining the peel strength on an Instron Tensile Tester. The samples were tested by heating them from room temperature to the peel strength temperature (73° F. or 120° F.), holding the samples at this temperature for one hour, and then subjecting them to the peel strength test at that temperature. The Instron Tensile Tester employed a head speed of 2" per minute, a head span of 4", and a full scale load of 100 lbs. The failure, which occurred in pulling the two laminated layers apart, was identified as follows:

(a) "Cloth," when the cloth pulled away from the adhesive layer, tearing the cloth fibers, or the cloth broke;

(b) "Leather," when the cloth and adhesive layer pulled away from the leather, tearing the leather fibers;

(c) "Rubber," when the cloth and adhesive layer pulled away from the rubber, tearing the rubber surface; and (d) "Adhesive," when the cloth pulled away from the adhesive layer, tearing few if any of the fibers of the cloth, or the cloth and adhesive layer pulled away from the other laminate layer, tearing little, if any, of that layer.

The results of the testing are shown in the table below.

The preferred adhesive is shown in Examples 1-10, and other adhesives within the scope of this invention are shown in Examples 15-17. Comparative tests of adhesives outside the scope of this invention are shown in Examples 11-14.

| Example | Molar proportions of acid component in polyester | Inherent viscosity | Application temperature, °C. | Substrates | Peel strength, lb. per inch | Type failure | Peel strength temperature, °F. |
|---|---|---|---|---|---|---|---|
| 1 | 50 Isophthalic acid<br>10 Hexahydroisophthalic acid<br>40 Terephthalic acid | 0.83 | 245 | Cloth to leather<br>do<br>do<br>do<br>do<br>Average | 54.5<br>45.0<br>54.0<br>44.0<br>42.0<br>47.9 | Cloth<br>Leather<br>Cloth<br>do<br>Adhesive | 73 |
| 2 | 50 Isophthalic acid<br>10 Hexahydroisophthalic acid<br>40 Terephthalic acid | 1.02 | 255 | Cloth to leather<br>do<br>do<br>do<br>do<br>Average | 49.0<br>49.0<br>43.0<br>46.0<br>47.0<br>46.8 | Cloth<br>do<br>do<br>do<br>do | 73 |
| 3 | 45 Isophthalic acid<br>15 Hexahydroisophthalic acid<br>40 Terephthalic acid | 0.85 | 245 | Cloth to leather<br>do<br>do<br>do<br>do<br>Average | 50.0<br>44.0<br>49.0<br>43.0<br>49.0<br>47.0 | Cloth<br>Adhesive<br>Cloth<br>Adhesive<br>Cloth | 73 |
| 4 | 45 Isophthalic acid<br>15 Hexahydroisophthalic acid<br>40 Terephthalic acid | 1.00 | 255 | Cloth to leather<br>do<br>do<br>do<br>do<br>Average | 47.0<br>41.0<br>59.0<br>43.0<br>53.0<br>48.6 | do<br>do<br>Adhesive<br>Cloth<br>do | 73 |
| 5 | 50 Isophthalic acid<br>10 Hexahydroiosphthalic acid<br>40 Terephthalic acid | 0.83 | 245 | Cloth to rubber<br>do<br>do<br>Average | 37.0<br>45.0<br>49.0<br>40.3 | Rubber<br>do<br>do | 73 |
| 6 | 50 Isophthalic acid<br>10 Hexahydroisophthalic acid<br>40 Terephthalic acid | 1.02 | 255 | Cloth to rubber<br>do<br>do<br>Average | 39.0<br>47.0<br>41.0<br>42.3 | do<br>do<br>do | 73 |
| 7 | 45 Isophthalic acid<br>15 Hexahydroisophthalic acid<br>40 Terephthalic acid | 0.85 | 245 | Cloth to rubber<br>do<br>do<br>Average | 52.0<br>52.0<br>53.0<br>52.3 | do<br>do<br>do | 73 |
| 8 | 45 Isophthalic acid<br>15 Hexahydroisophthalic acid<br>40 Terephthalic acid | 1.00 | 255 | Cloth to rubber<br>do<br>do<br>Average | 45.0<br>50.0<br>47.0<br>47.3 | do<br>do<br>do | 73 |
| 9 | 50 Isophthalic acid<br>10 Hexahydroisophthalic acid<br>40 Terephthalic acid | 0.83 | 245 | Cloth to leather<br>do<br>do<br>do<br>do<br>Average | 47.0<br>48.0<br>44.0<br>40.0<br>44.0<br>44.6 | Cloth<br>do<br>do<br>do<br>Adhesive | 120 |
| 10 | 45 Isophthalic acid<br>15 Hexahydroisophthalic acid<br>40 Terephthalic acid | 1.00 | 255 | Cloth to leather<br>do<br>do<br>do<br>do<br>Average | [1] 62.0<br>44.0<br>43.0<br>48.0<br>46.0<br>45.2 | do<br>do<br>do<br>do<br>do | 120 |
| 11 | 50 Isophthalic acid<br>50 Terephthalic acid | 0.87 | 245 | Cloth to rubber<br>do<br>do<br>do<br>Average | 22.0<br>[1] 60.0<br>13.0<br>12.0<br>15.7 | do<br>do<br>do<br>do | 73 |
| 12 | 60 Isophthalic acid<br>40 Terephthalic acid | 0.91 | 250 | Cloth to rubber<br>do<br>do<br>do<br>Average | 18.0<br>16.0<br>15.0<br>21.0<br>17.5 | do<br>do<br>do<br>do | 73 |
| 13 | 40 Isophthalic acid<br>15 Sebacic acid<br>45 Terephthalic acid | 0.72 | 240 | Cloth to rubber<br>do<br>do<br>do<br>Average | 12.0<br>12.5<br>25.0<br>23.0<br>18.1 | do<br>do<br>do<br>do | 73 |

| Molar proportions of acid component in polyester | Inherent viscosity | Application temperature, °C. | Substrates | Peel strength, lb. per inch | Type failure | Peel strength temperature, °F. |
|---|---|---|---|---|---|---|
| 14 ... {40 Isophthalic acid / 15 Adipic acid / 45 Terephthalic acid} | 0.87 | 245 | Cloth to rubber / ...do... / ...do... / ...do... / Average | 12.0 / 14.0 / 11.0 / 12.0 / 12.2 | ...do... / ...do... / ...do... / ...do... | 73 |
| 15 ... {55 Isophthalic acid / 15 Hexahydroisophthalic acid / 30 Terephthalic acid} | 0.87 | 245 | Cloth to rubber / ...do... / ...do... / ...do... / Average | 25.0 / 19.0 / 21.0 / 18.0 / 20.8 | ...do... / ...do... / ...do... / ...do... | 73 |
| 16 ... {45 Isophthalic acid / 10 Hexahydroisophthalic acid / 45 Terephthalic acid} | 0.67 | 240 | Cloth to rubber / ...do... / ...do... / ...do... / Average | 30.0 / 33.0 / 31.0 / 41.0 / 33.8 | ...do... / ...do... / ...do... / ...do... | 73 |
| 17 ... {45 Isophthalic acid / 15 Hexahydroisophthalic acid / 40 Terephthalic acid} | 0.87 | 245 | Cloth to rubber / ...do... / ...do... / ...do... / Average | 37.5 / 43.0 / 31.5 / 43.5 / 38.9 | ...do... / ...do... / ...do... / ...do... | 73 |

¹ Not included in the average.

Although the invention has been described in considerable detail with reference to certain preferred embodiments thereof, it will be understood that variations and modifications can be effected within the spirit and scope of the invention as described hereinabove and as defined in the appended claims.

What is claimed is:

1. A hot melt adhesive polymeric polyester of a mixture consisting essentially of (A) 1,4-butanediol and (B) a mixture totalling 100 mole percent of the following dicarboxylic acids or their dicarboxylic acid-functioning derivatives: 20–65 mole percent terephthalic acid, 30–60 mole percent isophthalic acid, and 5–20 mole percent hexahydroisophthalic acid.

2. The polyester of claim 1, wherein the proportions of the three components of (B) are: 40 mole percent terephthalic acid, 40–55 mole percent isophthalic acid, 5–20 mole percent hexahydroisophthalic acid.

3. The polyester of claim 1, wherein component (B) is a mixture of dialkyl terephthalate, dialkyl isophthalate, and dialkyl hexahydroisophthalate in which each alkyl group has 1–6 carbon atoms.

4. A laminate comprising two layers bonded to each other by a central, adhesive layer of the polyester of claim 1, said two layers being selected from the group consisting of leather, cloth, rubber, and paper.

5. The laminate of claim 4, wherein at least one of said two layers is leather.

References Cited

UNITED STATES PATENTS

| | | | |
|---|---|---|---|
| 3,013,914 | 12/1961 | Willard | 260—75 |
| 2,641,592 | 6/1953 | Hofrichter | 260—75 |
| 2,961,365 | 11/1960 | Sroog | 260—75 XR |
| 3,090,772 | 5/1963 | Crowell | 260—75 |

WILLIAM H. SHORT, Primary Examiner

L. P. QUAST, Assistant Examiner

U.S. Cl. X.R.

12—145; 117—139, 142, 143, 152; 156—320, 332; 161—226, 213, 232, 239